United States Patent [19]
Cooper

[11] 3,742,605
[45] July 3, 1973

[54] DENTAL IMPRESSION ACCESSORY AND METHOD

[76] Inventor: Abraham J. Cooper, 1 DeKalb Avenue, Brooklyn, N.Y. 11201

[22] Filed: Jan. 13, 1971
(Under Rule 47)

[21] Appl. No.: 106,160

[52] U.S. Cl. ................................. 32/17
[51] Int. Cl. ............................... A61c 9/00
[58] Field of Search ........................ 32/17

[56] References Cited
UNITED STATES PATENTS

| | | | |
|---|---|---|---|
| 3,304,608 | 2/1967 | Frohnecke | 32/17 |
| 3,530,585 | 9/1970 | Goldstine | 32/17 |
| 3,357,104 | 12/1967 | Greene et al. | 32/17 |

Primary Examiner—Robert Peshock
Attorney—Albert F. Kronman

[57] ABSTRACT

A tubular metal sleeve is fitted over the prepared tooth of which an impression is to be taken. The sleeve is trimmed to the height of the tooth. A cap member is secured to the sleeve by crimping. Impression material is placed within the capped sleeve and the assembly forced over the tooth. The cap prevents the sleeve from injuring the gums as the impression is made.

1 Claim, 5 Drawing Figures

PATENTED JUL 3 1973

3,742,605

INVENTOR.
ABRAHAM COOPER
BY
ATTORNEY 3,742,605

DENTAL IMPRESSION ACCESSORY AND METHOD

BACKGROUND OF THE INVENTION

In the manufacture of dental restorations the patient's tooth is initially cut back and prepared to form a firm support for the restoration. An impression of the cut back portion of the tooth is then made from which a die is cast. The die is a replica of the cut back tooth and is used as a base upon which the false tooth or bridge is built. When the restoration is completed it is removed from the die and secured to the patient's tooth. If the die is properly formed the false tooth or bridge will fit accurately upon the prepared cut back tooth.

One commonly employed method of making dental impressions is to slip a thin walled metal sleeve of suitable diameter over the prepared tooth and into the gingeval area around the tooth. Acrylic resin or other suitable material is then forced into the top of the sleeve and allowed to harden. The acrylic forms a plug to seal off the end of the sleeve. A small amount of the hardened acrylic is then ground away to provide a clearance above the tooth. This grinding operation is often inaccurate so that the patient's gums and subgingeval tissues are cut when the impression is taken or, if the clearance is insufficient, the impression is not deep enough. After the acrylic resin is properly ground down, a quantity of impression material is placed within the sleeve and the assembly forced over the prepared tooth. Upon hardening, the impression forms the mould into which the die material is poured.

Another presently used dental impression device consists of a thin walled shell, closed at one end and of a diameter to slip over the prepared tooth. Such devices prevent proper adjustment upon the patient's tooth and gums since it is not possible to look inside the shell as it is being fitted. Damage to the subgingival areas often occurs with such devices.

Accordingly, it is an object of the present invention to provide a dental impression accessory which will avoid the shortcomings of prior art devices.

Another object of the present invention is to reduce the time and amount of skill required to take highly accurate dental impressions.

A further object of the present invention is to provide an accessory for taking dental impressions which will lend itself to a wide variety of restoration requirements.

SUMMARY OF THE INVENTION

In the present invention, a thin walled tubular sleeve is slipped over the prepared tooth. The sleeve is cut off to a length equal to the height of the prepared tooth. A somewhat "U" shaped band is secured to the top of the sleeve and the impression material placed therein. The sleeve is then pressed down upon the tooth to make the impression.

DESCRIPTION OF THE DRAWINGS

In the accompanying drawing, forming part hereof, identical elements have been given the same reference numerals, in which drawings.

DESCRIPTION OF THE PREFERRED EMBODIMENT OF THE INVENTION

Figure 1:
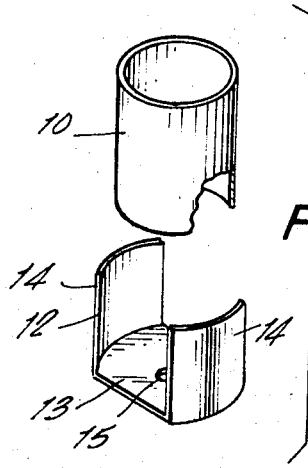
FIG. 1 is a somewhat exploded view, partly broken away of a complete embodiment of the present invention.
Figure 3:
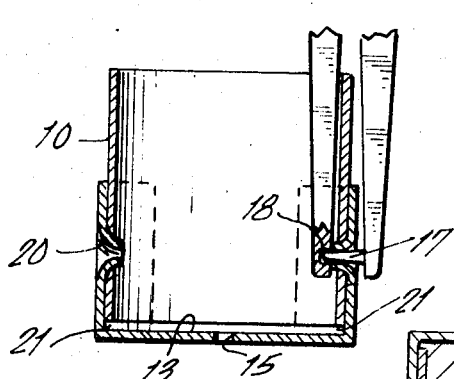
FIG. 3 is a view in vertical section, somewhat enlarged, showing the manner in which the dental impression accessory is secured together.
Figure 4:
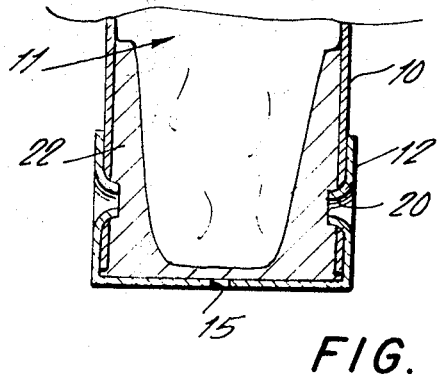
FIG. 4 is a view in vertical section, somewhat enlarged showing the taking of a dental impression employing the present invention.

Referring to the drawings and particularly to FIGS. 1, 3 and 4; 10 indicates a tubular metal sleeve formed of copper, aluminum or any other metal. The sleeve 10 is provided in a large number of diameters so as to make good frictional engagement with a prepared tooth 11. The tooth 11 as is customary in dental restoration work, is ground down to provide a firm support for the false tooth or bridge to be secured thereto.

A somewhat U-shaped cap 12 having a flat sleeve covering portion 13 and outwardly extending sleeve embracing members 14 complete the dental impression accessory. The U-shaped member 13 is also provided with an opening 15 for a hereinafter more fully described purpose. It will be understood that the dental impression accessory is formed of material which is sufficiently thin walled as to be easily trimmed by means of a scissors and fastened together by crimping in the manner shown in FIGS. 3 and 4.

Figure 2:
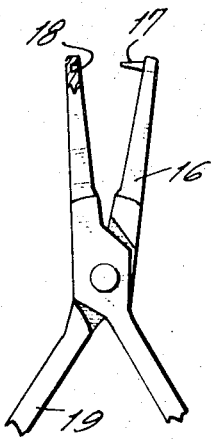
FIG. 2 is a fragmentary view, partly broken away of a crimping tool used in the present invention.

The crimping operation is carried out by means of the tool 16 shown in FIG. 2. The tool 16 is in the nature of a thin nosed pliers having a punch 17 on one of the jaws thereof and a recess 18 in the opposed jaw adapted to receive the punch 17. When the crimping tool is slipped over the walls of the dental impression accessory, in the manner shown in FIG. 3, and the handles 19 squeezed, the punch 17 forces the metal of the tube 10 and the cap 12 together in the manner indicated at 20 in FIG. 3. This crimping action serves to secure these two members together in a suitably permanent fashion.

In carrying out the steps necessary to take a dental impression using the present invention, the tooth 11 is prepared in the well known manner by grinding until a tooth structure parallel to the adjacent teeth is formed. A metal sleeve 10 of suitable diameter is then slipped over the tooth 11 in the manner shown in FIG. 4, and pressed down into the gingeval area around the prepared tooth. The sleeve 10 should make good frictional contact with the tooth at this juncture near the gum.

A line is then scribed on the interior of the sleeve 10 level with the top of the prepared tooth 11. The sleeve 10 is next slipped off the tooth and trimmed by means of a scissors to the scribed line. At this step, the sleeve 10 is of a length which will be equal to the height of the tooth when the sleeve is at the proper depth around the tooth.

A U-shaped cap 12 is then selected having an internal diameter such that it will readily slide upon the sleeve 10. As shown in FIG. 1, the sides 14 of the cap 13 are arcuate in shape so as to conform to the sleeve 10. With the cap 12 slipped upon the sleeve 10, it is held in a manner which will provide a small clearance 21 between the sleeve covering portion 13 and the end of the tube 10. A line is scribed into the outer surface of the sleeve 10 at the cap 12 to mark the proper clearance at this step. Thereafter, holding the sleeve 10 and the cap 12 so that they are in register with the line, the crimping tool 16 is employed as shown in FIG. 3 to secure the two elements together.

In addition to securing the caps and sleeve together, it will be seen that the crimping tool provides a hole to the walls of the two metal members through which the impression material may escape.

With the sleeve and cap assemble in the manner shown in FIG. 3, a quantity of dental impression material, such as wax, silicone, or synthetic rubber or the like 22 is placed within the assembly and the sleeve and cap slipped over the tooth 11 until it assumes a position shown in FIG. 4. Excess impression material would be forced out of the opening 15 and the openings provided by the crimping tool so that the sleeve 10 may come to rest upon the prepared tooth at the proper depth. Accumulated impression material at the top of the tooth and beneath the cap 13 serve to stop the sleeve 10 from penetrating too far into the gingeval portion of the gums.

After the impression material has hardened sufficiently, the entire assembly is slipped off the tooth leaving an impression of the tooth within the material carried by the sleeve 10.

The remaining steps in the preparation of the die is cast from the impression and the fabrication of a false tooth molar or bridge are well known and need not be discussed here.

Figure 5:
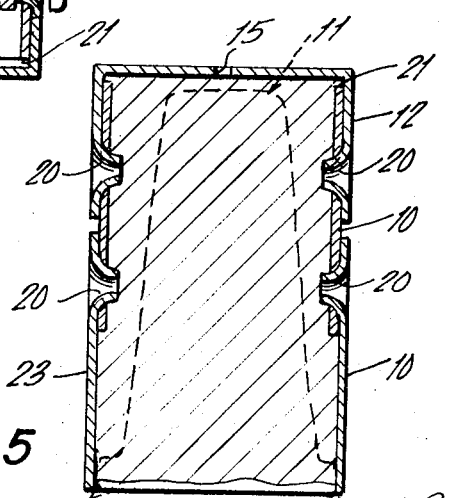
FIG. 5 is a view in vertical section illustrating the manner in which various sizes of the present invention can be constructed.

Referring to FIG. 5 there is shown a manner in which the present invention can be applied to a wide variety of requirements. In this embodiment, a second sleeve 23 is slipped over the first sleeve 10 and crimped to it by means of the tool 16. The length of the sleeve is thereby increased quickly and by the use of materials readily at hand.

From the foregoing will be seen that there has been provided a dental impression accessory which lends itself to a wide variety of rapid operations in the fabrication of artificial teeth and bridges. The accessory can be used for upper as well as lower teeth and a plurality of adjacent sleeves may be secured together so that the orientation of a plurality of teeth can be assured.

Having thus fully described the invention, what is claimed as new and desired to be secured by Letters Patents of the United States, is:

1. The method of taking an impression of a prepared tooth which comprises the steps of slipping a thin walled sleeve over the tooth and into the gingeval area around the tooth, cutting the sleeve to a length equal to the height of the sleeve securing a cap to one end of the sleeve and outwardly spaced therefrom, placing a quantity of a soft impression material within the capped sleeve and urging it back upon the tooth and into the gingeval area, permitting the impression to set and thereafter removing the sleeve and impression material from the prepared tooth.

* * * * *